United States Patent
Cockcroft

(10) Patent No.: US 9,223,940 B2
(45) Date of Patent: Dec. 29, 2015

(54) MERCHANDISING MEDIA BASED ON OWNERSHIP AUDIT

(71) Applicant: eBay Inc., San Jose, CA (US)

(72) Inventor: Oliver Nicholas Cockcroft, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 298 days.

(21) Appl. No.: 13/794,275

(22) Filed: Mar. 11, 2013

(65) Prior Publication Data

US 2014/0259185 A1    Sep. 11, 2014

(51) Int. Cl.
G06F 21/10 (2013.01)

(52) U.S. Cl.
CPC .............. *G06F 21/10* (2013.01); *G06F 21/105* (2013.01)

(58) Field of Classification Search
CPC ............................... G06F 21/10; G06F 21/105
See application file for complete search history.

(56) References Cited

U.S. PATENT DOCUMENTS

| | | | | |
|---|---|---|---|---|
| 8,855,334 B1* | 10/2014 | Lavine et al. | ................. | 381/119 |
| 2008/0155701 A1* | 6/2008 | Martinez et al. | ................. | 726/27 |
| 2008/0288411 A1* | 11/2008 | Copley | ............................ | 705/52 |
| 2010/0169977 A1* | 7/2010 | Dasher et al. | .................... | 726/26 |
| 2010/0174608 A1* | 7/2010 | Harkness et al. | .......... | 705/14.53 |
| 2012/0096047 A1* | 4/2012 | McCoy | .......................... | 707/803 |
| 2012/0260346 A1* | 10/2012 | Carey et al. | ..................... | 726/26 |
| 2014/0096263 A1* | 4/2014 | Mallardo et al. | ................ | 726/27 |

OTHER PUBLICATIONS

Haaker et al., Customer preferences for bundles of managed content services, Jun. 2007, 6th Conference on Telecommunication Techno-Economics, pp. 1-8.*

"Legitmix Will Automatically Clear Your Samples", © Prefix: 2012. [Online]. Retrieved from the Internet: <URL: http://www.prefix mag.com/news/legitmix-will-automatically-clear-your-samples/66256/>, (Jun. 13, 2012), 8 pages.

"Sell & Promote Your Remix (web page + video)", YouTube, [Online], Retrieved from the Internet: <URL: http://www.youtube.com/watch?v=l8XN-nXzcmE>, (May 11, 2011), (1 minute, 2 seconds),

* cited by examiner

*Primary Examiner* — Josnel Jeudy
*Assistant Examiner* — Kenneth Chang
(74) *Attorney, Agent, or Firm* — Schwegman Lundberg & Woessner, P.A.

(57) ABSTRACT

A machine performs an ownership audit on source media files whose media tracks are used, or proposed for use, in a mash-up media file. The machine may access a first group of media identifiers from a user's media library and identify authorized media files that the user is authorized to play or use in a mash-up. The machine may access a second group of media identifiers that identify source media files selected by the user for inclusion in a mash-up. The machine may determine whether all source media files are authorized and then present a notification that indicates whether the mash-up media file can be generated, or has been generated, exclusively from authorized media files. If a source media file is not authorized, the notification may include a suggestion that the user purchase an authorization to play the media file, use it in a mash-up, or both.

18 Claims, 11 Drawing Sheets

**Before Generation or Before Publication
of Mash-up Media File**

After Generation or After Publication of Mash-up Media File

MERCHANDISING MEDIA BASED ON OWNERSHIP AUDIT

TECHNICAL FIELD

The subject matter disclosed herein generally relates to the processing of data. Specifically, the present disclosure addresses systems and methods to present information related to merchandising media.

BACKGROUND

A media file may include one or more media tracks (e.g., an audio track, a video track, a text track, or a data track) that each represent media content (e.g., audio, video, captions, or commentary). For example, an audio file for a song recorded in stereo may store one audio track for left channel audio and another audio track for right channel audio. As another example, a video file for a movie with multiple soundtracks may store many media tracks, such as, high definition video track, a standard definition video track, a set of audio tracks for musical score (e.g., left stereo channel and right stereo channel), another set of audio tracks for sound effects (e.g., left front surround channel, center front surround channel, right front surround channel, left rear surround channel, right rear surround channel, and subwoofer channel), yet another set of audio tracks for dialogue in English (e.g., five surround channels), a further set of audio tracks for dialogue in French (e.g., five surround channels), and a text track for closed captions.

Media files may be stored by a user in a data repository as a media library (e.g., media collection) of the user. In some cases, the user is authorized to play a media file and its media tracks (e.g., by creating the media tracks stored in the media file, purchasing the media file and its media tracks, or otherwise being authorized to play the media file). In other cases, the user is not authorized to play the media file or any of its media tracks.

BRIEF DESCRIPTION OF THE DRAWINGS

Some embodiments are illustrated by way of example and not limitation in the figures of the accompanying drawings.

DETAILED DESCRIPTION

Figure 1:
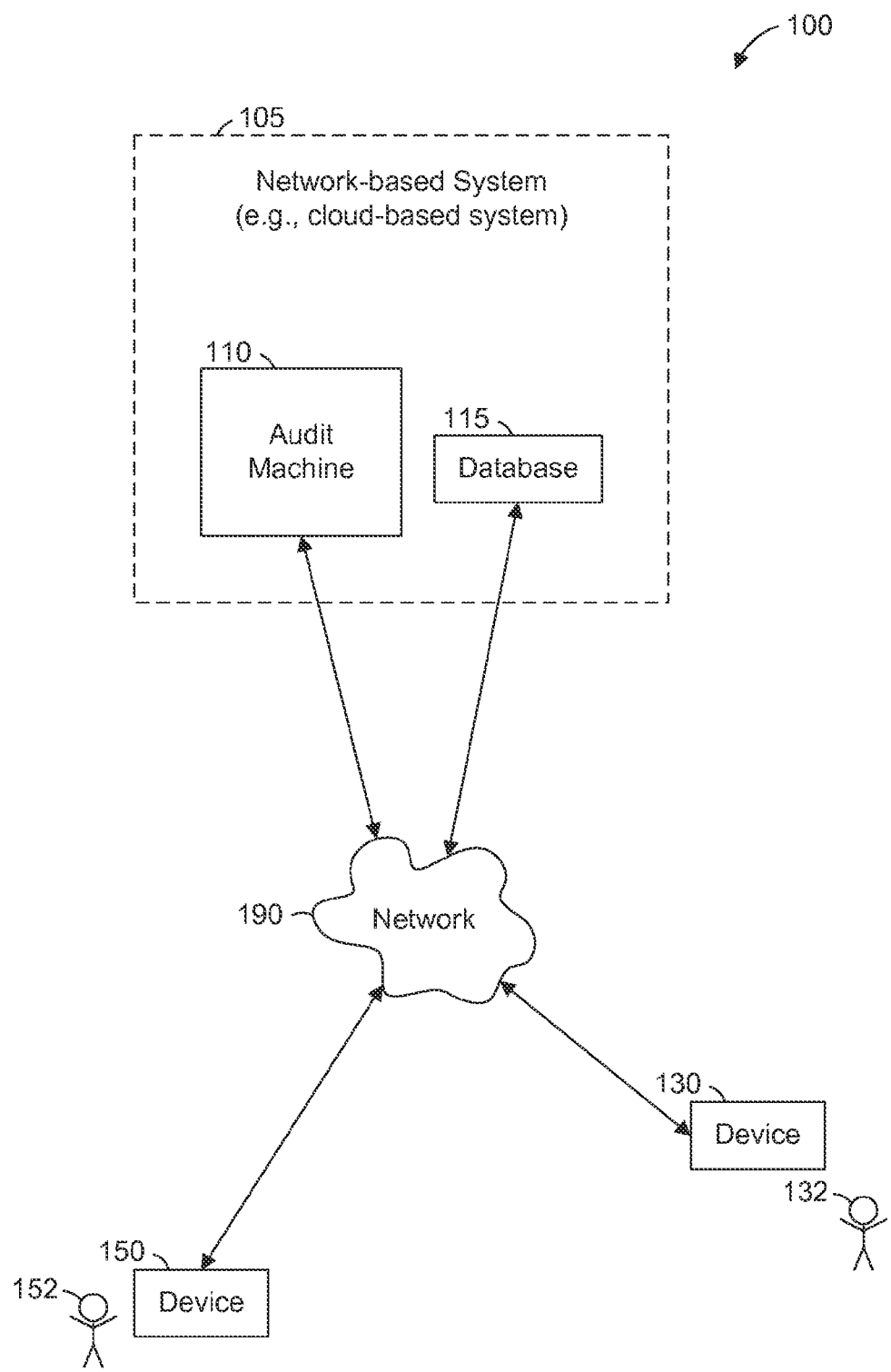
FIG. 1 is a network diagram illustrating a network environment 100 suitable for merchandising media (e.g., one or more media files) based on an ownership audit, according to some example embodiments.

Example methods and systems are directed to merchandising media files based on ownership audits. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The user with access to a library of media files may wish to create a new media file by combining media tracks that are taken from different media files from the library. The new media file may be known as a "mash-up" or a "mash-up media file," and the media files from which the combined media tracks are taken may be known as "source media files." Hence, media tracks that are included in different source media files may be combined, in whole or in part, into a simultaneous mix of media tracks that are configured to be presented contemporaneously (e.g., played in parallel) when the mash-up media file is played. For example, a mash-up media file may include a simultaneous mix of a vocal track from one source media file with an instrumental track from another source media file, so that the vocal track and the instrument tracks are played together at the same time when the mash-up media file is played.

As another example, mash-up media file may combine a female vocal track from one source media file (e.g., a song sung by Janis Joplin, who died in 1970), a male vocal track from another source media file (e.g., a song sung by Justin Bieber, who was born in 1994), a guitar track from a third source media file (e.g., a song on which Django Reinhardt played guitar), a drum track from a fourth source media file (e.g., a song on which Phil Collins played drums), and a video track from a fifth source media file (e.g., a scene from "Jurassic Park" (1993)), into a simultaneous mix that blends all of these tracks during playback of the mash-up media file. In some situations, however, a created or proposed mash-up media file may include one or more media tracks to which the creator of the mash-up media file lacks authorization to play, authorization to use in a mash-up, or both.

A machine may be configured (e.g., by software modules such as those described herein) to perform an ownership audit on source media files whose media tracks are used or proposed for use in a mash-up media file. An ownership audit may access a user's media library and identify media files (e.g., source media files) that the user "owns" in the sense that the user has ownership of an authorization to play the media file, authorization to use the media file in a mash-up, or both. Accordingly, the machine (e.g., a server machine or a client device) may access a group of media identifiers (e.g., a first group of media identifiers) from a media library of the user and identify authorized media files that the user is authorized to play, use in a mash-up, or both. The machine may access another group of media identifiers (e.g., second group of media identifiers) that are selected by the user for a mash-up, where these selected media identifiers identify source media files with media tracks selected by the user for generating a mash-up media file.

The machine may then determine whether all of the source media files are authorized media files. Based on this determination, the machine may present a notification that indicates whether the mash-up media file can be generated, or has been generated, exclusively from the authorized media files. If at least one of the source media files is not an authorized media file, the notification may include a suggestion that the user authorize the unauthorized media file (e.g., by purchasing an authorization to play the unauthorized media file, an authorization to use them unauthorized media file in a mash-up, or both).

FIG. 1 is a network diagram illustrating a network environment 100 suitable for merchandising media (e.g., one or more media files) based on an ownership audit, according to sonic example embodiments. The network environment 100 includes an audit machine 110, a database 115, and devices 130 and 150, all communicatively coupled to each other via a network 190. The audio machine 110, the database, 115, and the devices 130 and 150 may each be implemented in a computer system, in whole or in part, as described below with respect to FIG. 11.

The audit machine 110, with or without the database 115, may form all or part of a network-based system 105. For example, the network-based system 105 may be or include a cloud-based server system that provides a service in which media files may be merchandised based on ownership audits.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

The user 132 may be a creator of a mash-up media file. For example, the user 132 may use the device 130 to execute media editor software, which may configure the device 130 to extract and combine media tracks from various media files accessible to the device 130 (e.g., a media library of the user 132). In some example embodiments, the user 132 has selected one or more media identifiers that identify source media files with media tracks selected by the user 132 for generating a mash-up media file yet to be created (e.g., generated). In certain example embodiments, the mash-up media file has already been created, and the source media files whose media tracks were used to generate the mash-up media file may be identified by a corresponding media identifiers (e.g., stored in metadata of the mash-up media file, stored in the database 115, stored at the device 130, or any suitable combination thereof).

The user 152 may be a non-creator of a mash-up media file created by the user 132. For example, the user 152 may be a social connection of the user 132 (e.g., socially connected as a friend, follower, or connection by one or more social networking services). As another example, the user 152 may be a member of the general public. In some example embodiments, the user 152 has accessed the mash-up media file (e.g., by downloading it or receiving it as an attachment). In certain example embodiments, the user 152 has accessed a reference to the mash-up media file. For example, the user 152 may view a set of search results that include a reference to the mash-up media file, access a document (e.g., a review of the mash-up media file) that references the mash-up media file, receive a suggestion that the user 152 would enjoy the mash-up media file (e.g., sent from a friend of the user 152), or any suitable combination thereof.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 16. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the audit machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
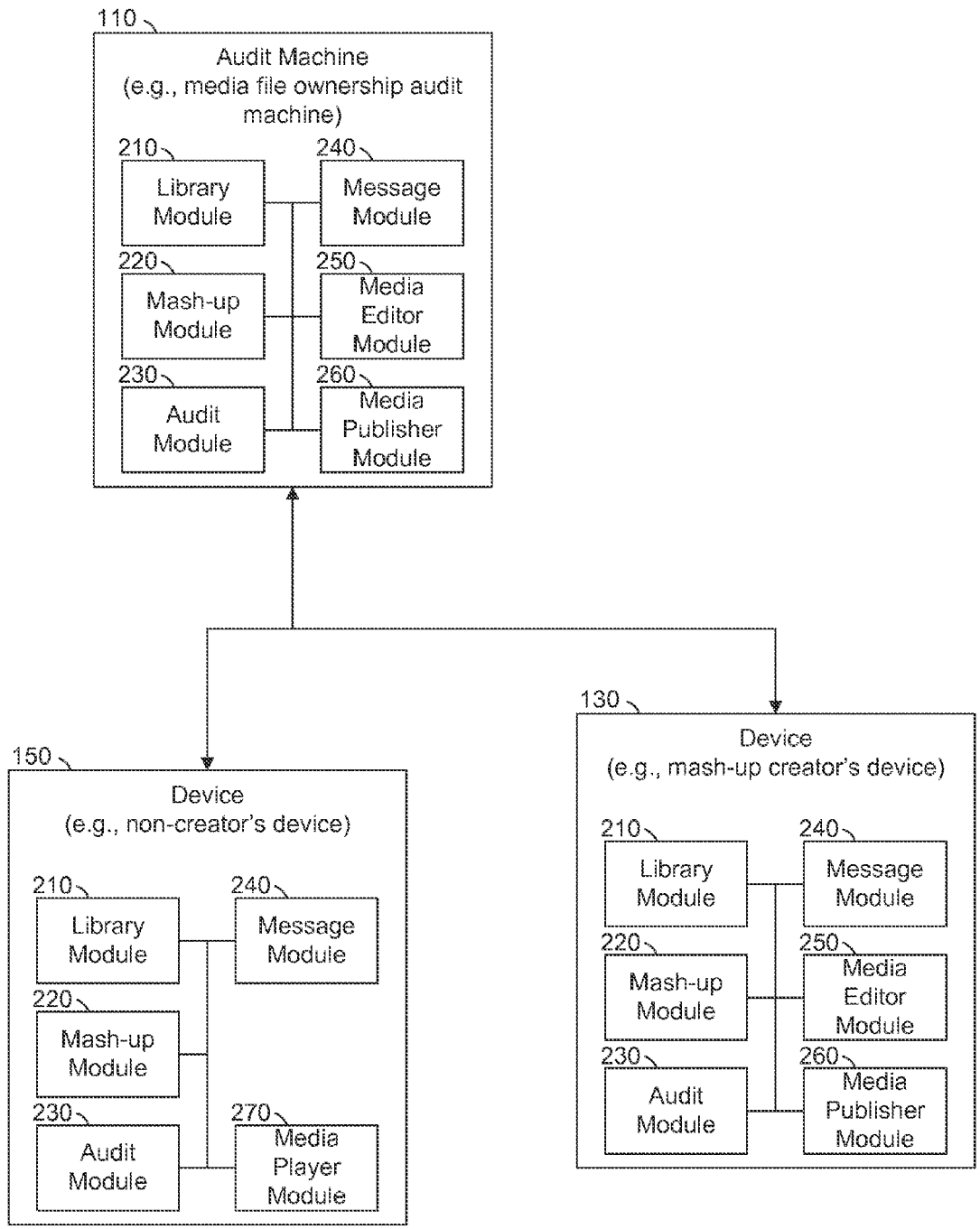
FIG. 2 is a block diagram illustrating modules (e.g., components) of an audit machine and devices that are suitable for merchandising media based on an ownership audit, according to some example embodiments.

FIG. 2 is a block diagram illustrating modules (e.g., components) that may be implemented in the audit machine 110, the device 130, the device 150, or any suitable combination thereof, according to some example embodiments. In some example embodiments, the audit machine 110 includes one or more of a library module 210, a mash-up module 220, an audit module 230, a message module 240, a media editor module 250, and a media publisher module 260, all configured to communicate with each other (e.g., via a bus, shared memory, or a switch). The media editor module 250 may form all or part of media editor application (e.g., an editing and compositing application that enables extraction, modification, combination, composition, and creation of new media files from various media tracks). The media publisher module 260 may form all or part of a media publisher application (e.g., a filesharing application for sharing or publishing media files, an electronic commerce application for selling or distributing media files, or any suitable combination thereof).

In certain example embodiments, the device 130 includes one or more of the library module 210, the mash-up module 220, the audit module 230, the message module 240, the media editor module 250, and the media publisher module 260, all configured to communicate with each other. In various example embodiments, the device 150 includes one or more of the library module 210, the mash-up module 220, the audit module 230, the message module 240, and a media player module 270, all configured to communicate with each other. As noted above with respect to FIG. 1, the audit machine 110, the device 130, and the device 150 may communicate with each other (e.g., via the network 190).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
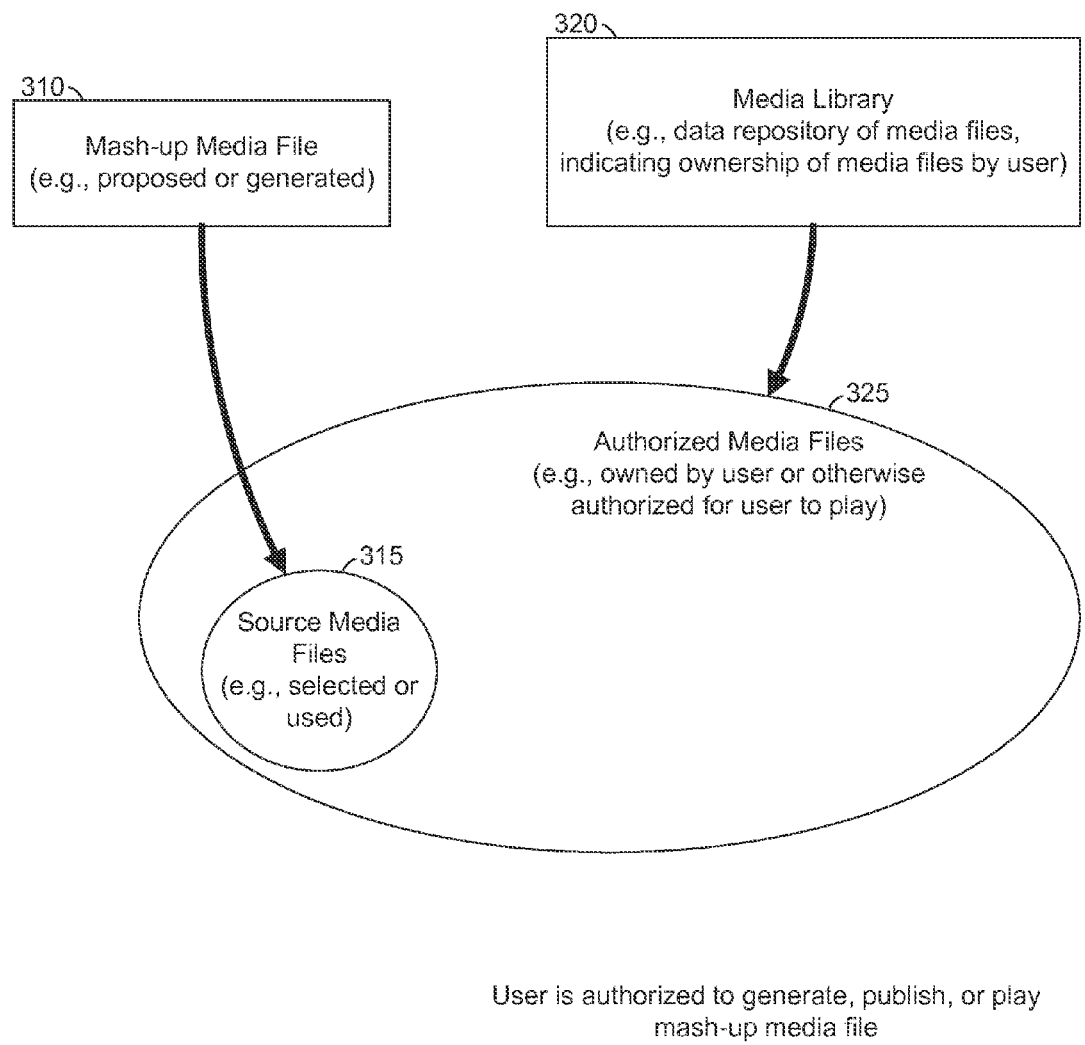
FIG. 3 is a conceptual diagram illustrating source media files of a mash-up media file being entirely included among authorized media files that a user owns or is otherwise authorized to play, according to some example embodiments.

FIG. 3 is a conceptual diagram illustrating source media files 315 of a mash-up media file 310 being entirely included among authorized media files 325 that a user (e.g., user 132 or user 152) owns or is otherwise authorized to play (e.g., on a device of the user), according to some example embodiments. As shown in FIG. 3, the mash-up media file 310 may be already generated (e.g., stored by the database 115, by the device 130, or by the device 150), or proposed for generation (e.g., by the user 132, for example, using media editor module 250 on the device 130). The mash-up media file 310 includes media tracks from the source media files 315. In some situations, the mash-up media file 310 is already generated from the source media files 315. In other situations, the mash-up media file 310 is proposed to be generated, and the source media files 315 are selected for use in generating the mash-up media file 310.

As shown in FIG. 3, a media library 320 (e.g., a media collection of the user 132, or a media collection of the user 152) is a data repository of various media files, and the media library 320 indicates ownership of the media files included therein. As noted above, "ownership" of a media file refers to owning an authorization to play the media file, an authorization to use the media file in a mash-up, or both. Based on the indicated ownership of each of the media files in the media library 320, the authorized media files 325 can be determined (e.g., by the audit machine 110, the device 130, or the device 150). In FIG. 3, the source media files 315 (e.g., selected for, or used in, the mash-up media file 310) are fully included among the authorized media files 325. Based on the mash-up media file 310 being generated, or able to be generated, exclusively from the authorized media files 325, the user of the media library 320 (e.g., user 132 or user 152) may be authorized to generate the mash-up media file 310, publish the mash-up media file 310, play the mash-up media file 310, or any suitable combination thereof.

Figure 4:
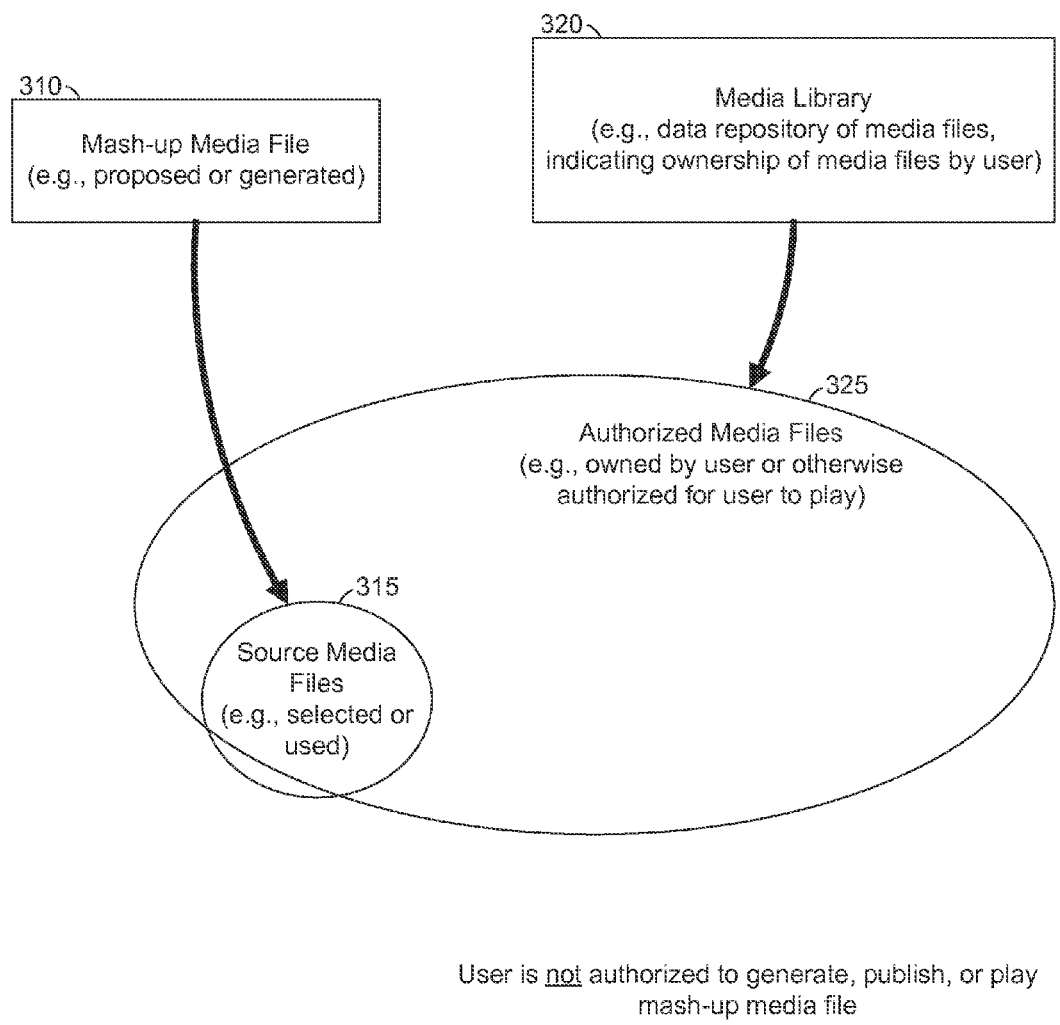
FIG. 4 is a conceptual diagram illustrating source media files of a mash-up media file being only partially included among authorized media files that a user owns or is otherwise authorized to play, according to some example embodiments.

FIG. 4 is a conceptual diagram illustrating source media files 315 of the mash-up media file 310 being only partially included among the authorized media files 325, according to some example embodiments. In FIG. 4, the source media files 315 (e.g., selected for, or used in, the mash-up media file 310 are only partly included among the authorized media files 325. That is, at least one of the source media files 315 is excluded from the authorized media files 325. Based on the mash-up media file 310 not being generated exclusively from the authorized media files 325, or not being able to be generated exclusively from the authorized media files 325, the user of the media library 320 (e.g., user 132 or user 152) may be unauthorized to generate the mash-up media file 310, publish the mash-up media file 310, play the mash-up media file 310, or any suitable combination thereof.

Such a user (e.g., user 132 or user 152) may be presented (e.g., by the audit machine 110, the device 130, or the device 150) with information that merchandises one or more unauthorized media files among the source media files 315. For example, such information may include a suggestion that the user authorize an unauthorized media file by purchasing the unauthorized media file (e.g., by purchasing an authorization to play the unauthorized media file, an authorization to use them unauthorized media file in a mash-up, or both).

Figure 5:
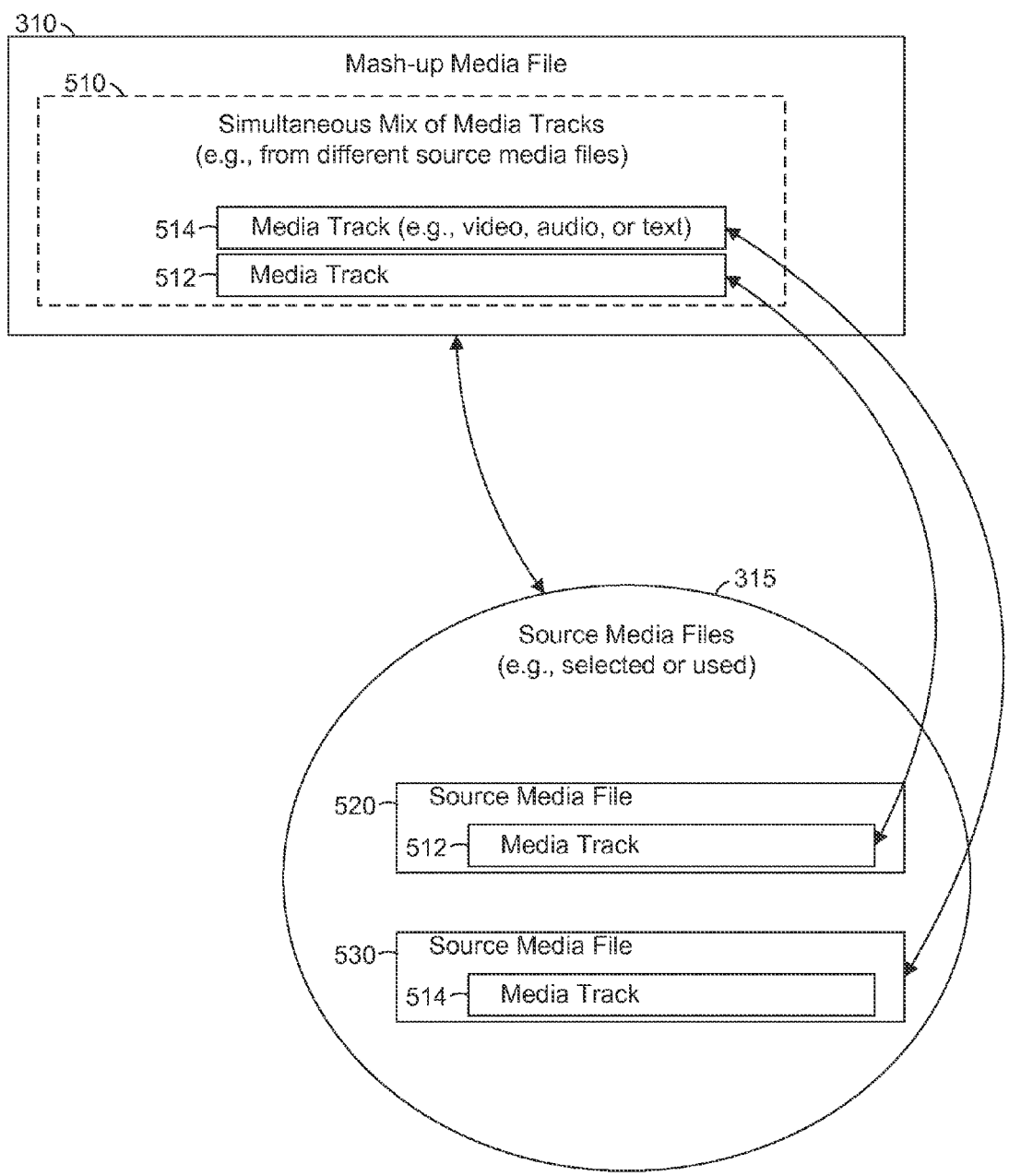
FIG. 5 is a conceptual diagram illustrating a mash-up media file whose media tracks are taken from different source media files, according to some example embodiments.

FIG. 5 is a conceptual diagram illustrating the mash-up media file 310, whose included media tracks 512 and 514 are taken from different source media files 520 and 530, according to some example embodiments. As shown in FIG. 5, the source media files 520 and 530 are included among the source media files 315, which may be selected fir use in generating the mash-up media file 310 (e.g., in situations where the mash-up media file 310 is not yet generated) or already used in generating the mash-up media file 310 (e.g., in situations where the mash-up media file 310 has been previously generated).

The source media file 520 includes the media track 512, which is used or selected for use in a simultaneous mix 510 of media tracks within the mash-up media file 310. The source media file 520 may include any number of additional media tracks. In FIG. 5, however, the media track 512 is depicted as being incorporated or proposed for incorporation into the mash-up media file 310.

The source media file 530 includes the media track 514, which is used or selected for use in the simultaneous mix 510 of media tracks within the mash-up media file 310. The source media file 530 may include any number of additional media tracks. In FIG. 5, however, the media tracks 514 is depicted as being incorporated or proposed for incorporation into the mash-up media file 310.

The simultaneous mix 510 of media tracks may form all or part of the mash-up media file 310, and the simultaneous mix 510 may blend the media tracks 512 and 514 together during playback of the mash-up media file 310. As depicted in FIG. 5, the simultaneous mix 510 of media tracks is may contain media tracks (e.g., media tracks 512 and 514) from different source media files (e.g., source media files 520 and 530).

Figure 6:
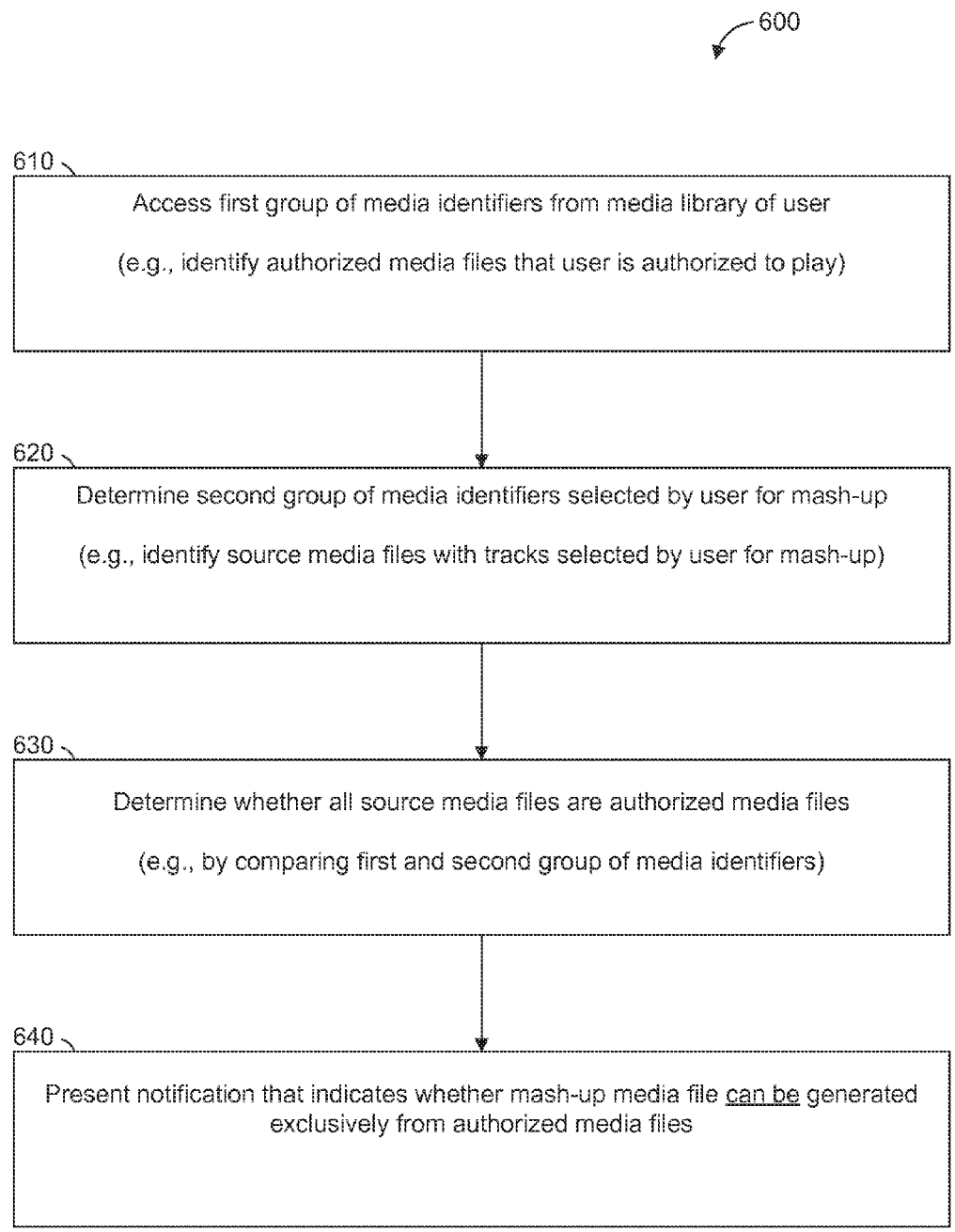
FIGS. 6 and 7 are flowcharts illustrating operations of the audit machine, or the device of the creator of a mash-up media file, in performing a method of merchandising a media file based on an ownership audit, according to some example embodiments.
Figure 7:
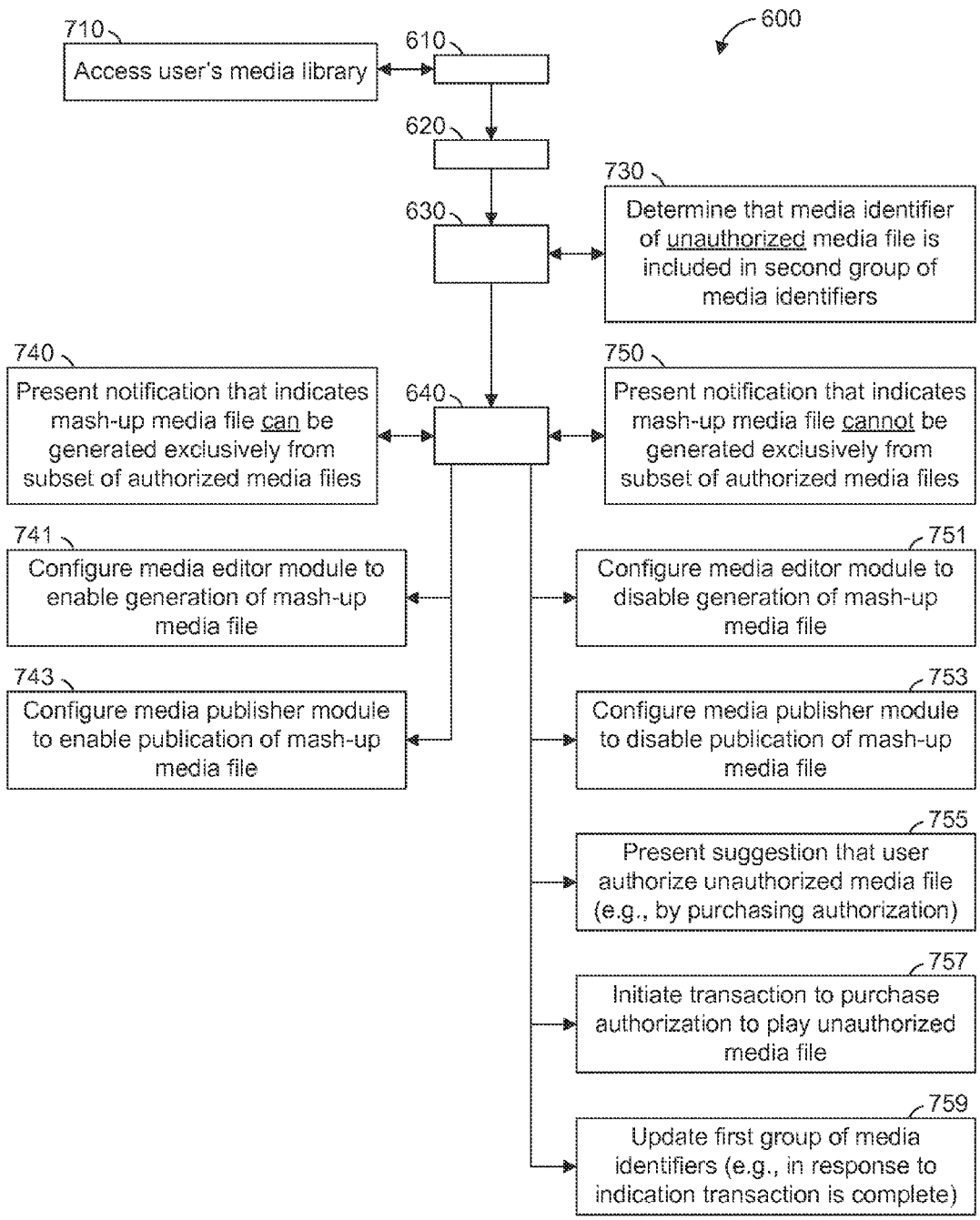

FIGS. 6 and 7 are flowcharts illustrating operations of the audit machine 110 or the device 130 (e.g., a device of the user 132, who may be the creator of the mash-up media file 310) in performing a method 600 of merchandising a media file (e.g., source media file 530) based on an ownership audit, according to some example embodiments. Operations in the method 600 may be performed using modules described above with respect to FIG. 2. As shown in FIG. 6, the method 600 includes operations 610, 620, 630, and 640, and the method 600 may be performed prior to generation of the mash-up media file 310 or prior to publication of the mash-up media file 310.

In operation 610, the library module 210 accesses a first group of media identifiers that identify the authorized media files 325, which may be authorized for the user 132 to play (e.g., playback on the device 130), use in generating a mash-up, or both. The library module 210 may thus identify the authorized media files 325 that the user 132 is authorized to play, use in a mash-up, or both.

In operation 620, the mash-up module 220 determines a second group of media identifiers that identify the source media files 315, which may be selected by the user 132 for at least partial inclusion within the mash-up media file 310 to be generated by the user 132. The mash-up module 220 may thus identify the source media files 315, which include media tracks (e.g., media tracks 512 and 514) that are selected by the user 132 for use in generating the mash-up media file 310.

In some example embodiments, the mash-up media file 310 is neither generated nor published, but the mash-up media file 310 is proposed for generation, for example, as a result of the user 132 using the media editor module 250 (e.g., a media editing or compositing application, applet, or mobile app). For example, the user 132 may use the media editor module 250 to specify the source media files 315 or media tracks contained therein (e.g., media tracks 512 and 514) are selected for inclusion in a new mash-up media file to be created as the mash-up media file 310. The second group of media identifiers may hence be determined by accessing (e.g., querying) the media editor module 250 to detect media identifiers for the source media files 315. These detected media identifiers may therefore be determined as the second group of media identifiers.

In certain example embodiments, the mash-up media file 310 is generated but not published, and the mash-up media file 310 is proposed for publication by the media publisher module 260 (e.g., a media publishing, uploading, or blogging application, applet, or mobile app). For example, the user 132 may use the media publisher module 260 to specify that the mash-up media file 310 is selected for publication, and the media publisher module 260 may access (e.g., query) information that references media identifiers for the source media files 315. Such information may be stored in metadata of the mash-up media file 310, stored in the database 115, stored at the device 130, or any suitable combination thereof. The second group of media identifiers may thus be determined by accessing (e.g., querying) the media publisher module 260 to detect media identifiers for the source media files 315. These detected media identifiers may accordingly be determined as the second group of media identifiers.

In operation 630, the audit module 230 determines whether all of the source media files 315 are included among the authorized media files 325. This determination may be performed based on a comparison of the first group of media identifiers (e.g., from operation 610) to the second group of media identifiers (e.g., from operation 620).

In operation 640, the message module 240 presents a notification that indicates whether the mash-up media file 310 can be generated (e.g., if the mash-up media file 310 has not yet been generated), or was generated (e.g., if the mash-up media file 310 has been generated), exclusively from the authorized media files 325. The presenting of the notification may be based on whether all of the source media files 315 are included among the authorized media files 325, as determined in operation 630. For example, the message module 240 (e.g., whether located in the audit machine 110 or in the device 130), may cause the device 130 to display the notification to the user 132.

As shown in FIG. 7, the method 600 may include one or more of operations 710, 730, 740, 741, 743, 750, 751, 753, 755, 757, and 759. Operation 710 may be performed as part (e.g., a precursor task, a subroutine, or portion) of operation 610, in which the library module 210 accesses the first group of media identifiers. In operation 710, the library module 210 may access the first group of media identifiers by accessing a media library (e.g., media library 320) of the user 132 (e.g., a collection of media files owned by the user 132 and stored in the database 115 or at the device 130).

In situations where all of the source media files 315 are a subset of the authorized media files 325 (e.g., as shown in FIG. 3), operation 630 may be performed based on the second group of media identifiers (e.g., from operation 620) being included in the first group of media identifiers (e.g., from operation 610). Moreover, in such cases, operation 740 may be performed as part of operation 640, in which the message module 240 presents the notification regarding whether the mash-up media file 310 can be generated, or has been generated, exclusively from the authorized media files 325. In operation 740, the notification presented by the message module 240 indicates that the mash-up media file 310 can be generated, or has been generated, exclusively from the subset of the authorized media files 325.

In these situations, the performance of operation 630 by the audit module 230 may determine that all of the source media files 315 are included among the authorized media files 325, and one or more of operations 741 and 743 may be performed subsequent to operation 640. Operation 741 may be performed in cases where the mash-up media file 310 has not yet been generated. In operation 741, the audit module 230 configures the media editor module 250 to enable (e.g., allow) generation of the mash-up media file 310. This configuration of the media editor module 250 may be performed based on (e.g., in response to) the source media files 315 all being included among the authorized media files 325.

Operation 743 may be performed in cases where the mash-up media file 310 has already been generated, but not yet published. In operation 743, the audit module 230 configures the media publisher module 260 to enable (e.g., allow) publication of the mash-up media file 310. This configuration of the media publisher module 260 may be performed based on (e.g., in response to) all of the source media files 315 being included among the authorized media files 325.

In situations where the source media files 315 include at least one unauthorized media file that is absent from the authorized media files 325 (e.g., as shown in FIG. 4), operation 730 may be performed as part of operation 630, in which the audit module 230 determines whether all of the source media files 315 are included among the authorized media files 325. In operation 730, the audit module 230 determines that a media identifier of an unauthorized media file is included in the second group of media identifiers (e.g., from operation 620). This determination may be performed based on a comparison of the first group of media identifiers (e.g., from operation 610) to the second group of media identifiers (e.g., from operation 620). Accordingly, operation 630 may be performed based on the second group of media identifiers (e.g., from operation 620) including the media identifier that identifies the unauthorized media file and is absent from the first group of media identifiers (e.g., from operation 610).

Moreover, in such cases, operation 750 may be performed as part of operation 640, in which the message module 240 presents the notification regarding whether the mash-up media file 310, can be generated, or has been generated, exclusively from the authorized media files 325. In operation 750, the notification presented by the message module 240 indicates that the mash-up media file 310 cannot be generated, or has not been generated, exclusively from the subset of the authorized media files 325.

In these situations, the performance of operation 630 by the audit module 230 may determine that the source media files 315 include an unauthorized media file that is absent from the authorized media files 325, and one or more of operations 751, 753, 755, 757, and 759 may be performed subsequent to operation 640. Operation 751 may be performed in cases where the mash-up media file 310 has not yet been generated. In operation 751, the audit module 230 configures the media editor module 250 to disable (e.g., prevent) generation of the mash-up media file 310. This configuration of the media editor module 250 may be performed based on (e.g., in response to) the source media files 315 including the unauthorized media file, which is absent from the authorized media files 325.

Operation 753 may be performed in cases where the mash-up media file 310 has already been generated, but not yet published. In operation 753, the audit module 230 configures the media publisher module 260 to disable (e.g., prevent) publication of the mash-up media file 310. This configuration of the media publisher module 260 may be performed based on (e.g., in response to) the source media files 315 including the unauthorized media file, which is absent from the authorized media files 325.

In operation 755, the message module 240 presents a suggestion (e.g., within a message, notification, an alert, warning, or an advertisement) that the user 132 authorize the unauthorized media file, for example, by purchasing an authorization to play the unauthorized media file, use the unauthorized media file in a mash-up, or both. For example, the message module 240 (e.g., whether located in the audit machine 110 or in the device 130), may cause the device 130 to display the suggestion to the user 132. In some example embodiments, the presented suggestion contains a user interface that is operable to initiate a transaction to purchase such an authorization (e.g., electronic storefront). In certain example embodiments, the presented suggestion contains a link to such a user interface.

In cases where the user 132 operates a user interface to initiate a purchase of such an authorization, operations 757 and 759 may be performed. In operation 757, the audit module 230 initiates the transaction to purchase the authorization to play the unauthorized media file, use the unauthorized media file in creating a mash-up media file (e.g., mash-up media file 310), or both. For example, the audit module 230 may cause electronic storefronts to initiate such a purchase transaction. After completion of such a transaction, operation 759 may be performed by the audit module 230. In operation 759, the library module 210 detects that the initiated transaction is complete and, based on this detection, updates the first group of media identifiers (e.g., accessed in operation 610) to include the media identifier of the media file for which authorization was purchased by completion of the transaction. Accordingly, library module 210 may update the authorized media files 325 to include the newly authorized media file.

Figure 8:
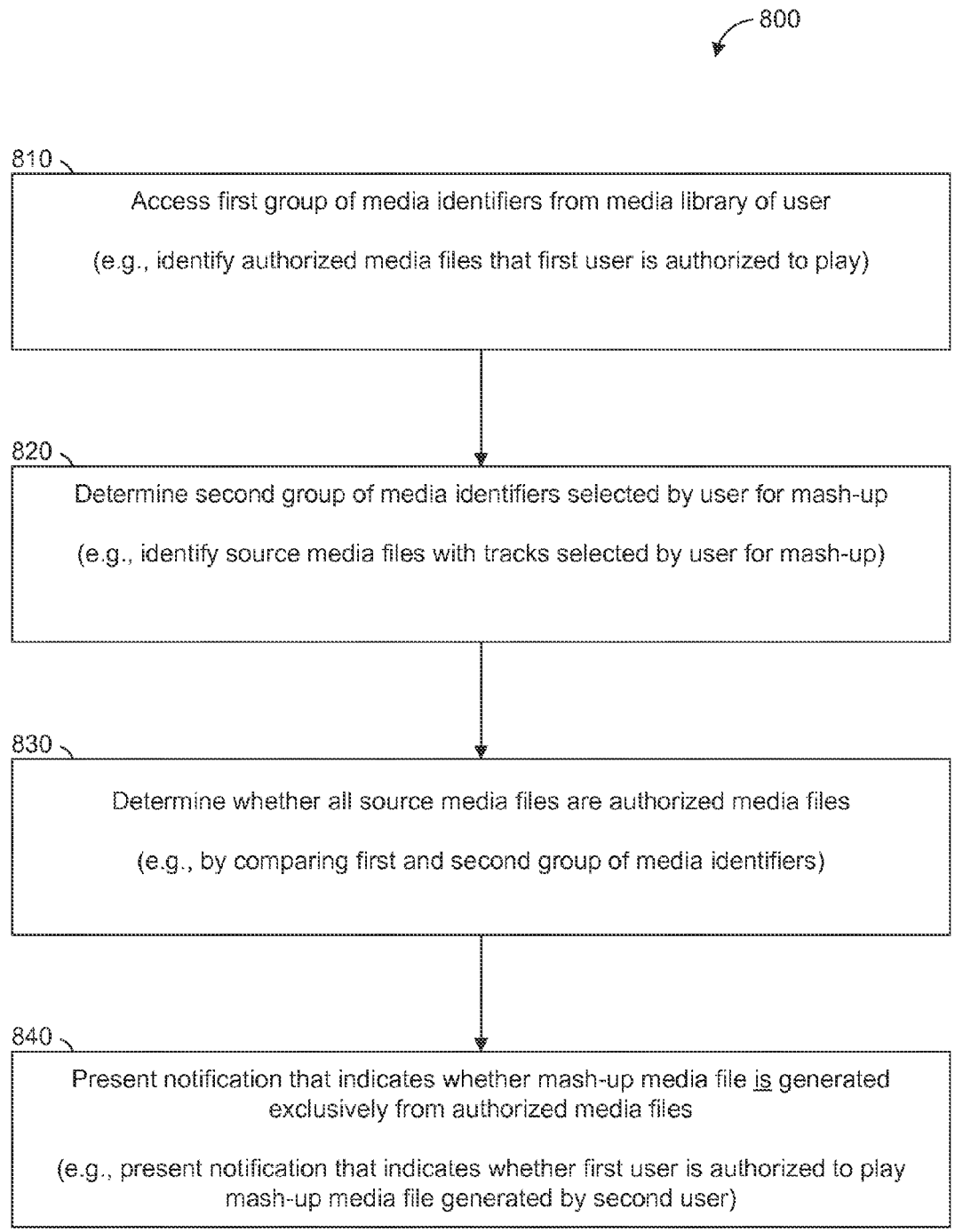
FIG. 8-10 are flowcharts illustrating operations of the audit machine, or the device of a non-creator of the mash-up media file, in performing a method of merchandising a media file based on an ownership audit, according to some example embodiments.
Figure 9:
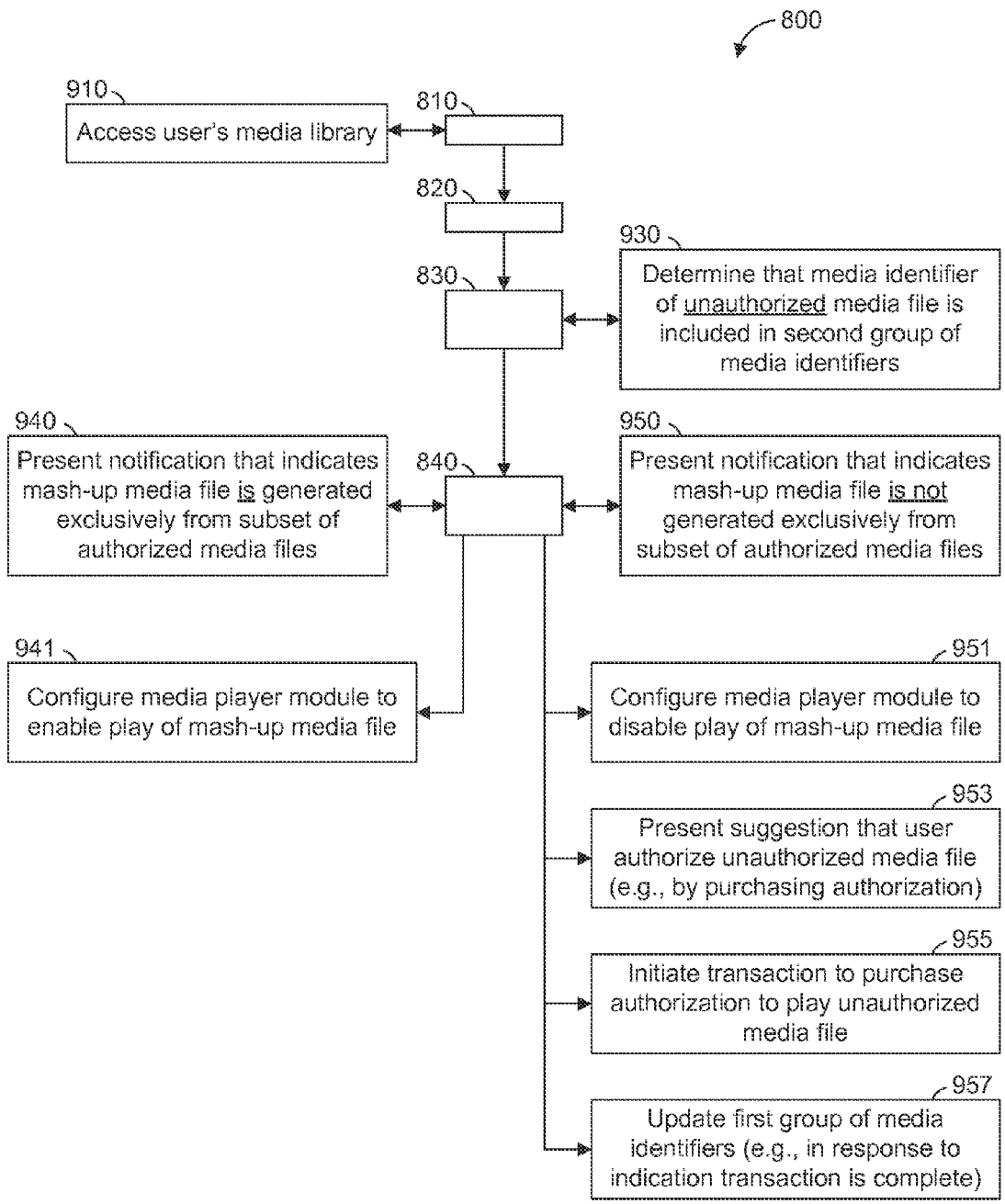
Figure 10:
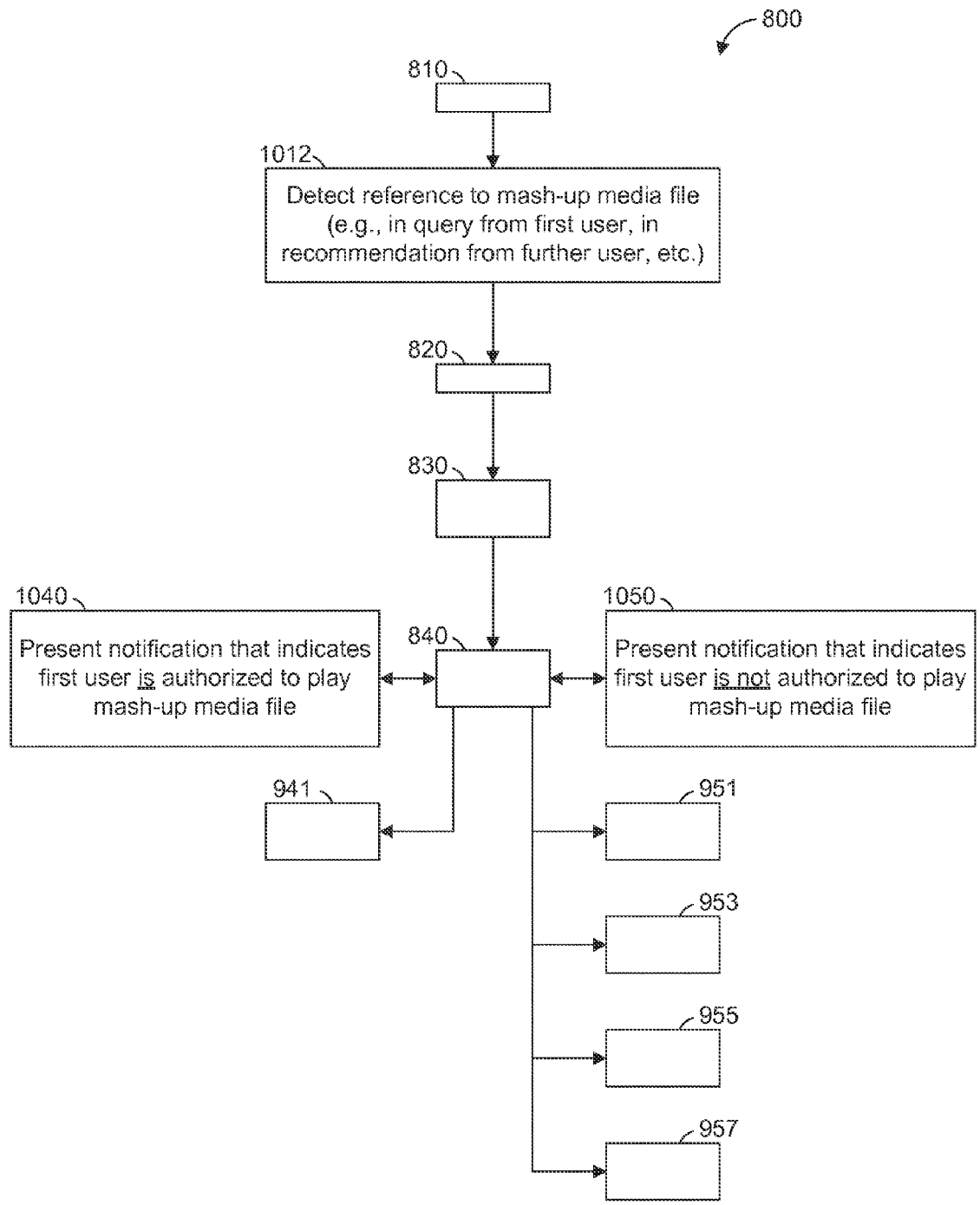

FIG. 8-10 are flowcharts illustrating operations of the audit machine 110 or the device 150 (e.g., a device of the user 152, who may be a non-creator of the mash-up media file 310) in performing a method 800 of merchandising a media file (e.g., source media file 530) based on an ownership audit, according to some example embodiments. Operations in the method 800 may be performed using modules described above with respect to FIG. 2. As shown in FIG. 8, the method 800 includes operations 810, 820, 830, and 840, and the method 800 may be performed subsequent to generation of the mash-up media file 310 or subsequent to publication of the mash-up media file 310.

In operation 810, the library module 210 accesses a first group of media identifiers (e.g., a first plurality of media identifiers) that identify the authorized media files 325, which may be authorized for the user 152 to play (e.g., playback on the device 150). The library module 210 may thus identify the authorized media files 325 that the user 152 is authorized to play.

In operation 820, the mash-up module 220 determines a second group of media identifiers (e.g., a second plurality of media identifiers) that identify the source media files 315, which may be at least partially included within the mash-up media file 310 (e.g., generated by the user 132). The mash-up module 220 may thus identify the source media files 315, which include media tracks (e.g., media tracks 512 and 514) that were used in generating the mash-up media file 310.

The mash-up media file 310 may be generated, published, or both, and the user 152 may have obtained access to the mash-up media file 310. For example, the user 152 may have downloaded the mash-up media file 310 to the device 150 from a server that published the mash-up media file 310 (e.g., network-based system 105 or database 115). As another example, the user 152 may have received the mash-up media file 310 (e.g., via the device 150) as an attachment to a message (e.g., an email, a microblog post, an instant message, chat message, or any suitable combination thereof). As a further example, the user 152 may have received a reference (e.g., a link) to a network location (e.g., accessible using the network 190) from which the mash-up media file 310 may be retrieved (e.g., database 115).

Accordingly, the mash-up media file 310 may be proposed for playback, for example, as a result of the user 152 using the media player module 270 (e.g., a media presentation or playback application, applet, or mobile app). For example, the user 152 may use the media player module 270 to specify that the mash-up media file 310 is selected for playing (e.g., playing immediately or as an upcoming selection within a playlist), and the media player module 270 may access (e.g., query) information that references media identifiers for the source media files 315. Such information may be stored in metadata of the mash-up media file 310, stored in the database 115, stored at the device 130, stored at the device 150, or any suitable combination thereof. The second group of media identifiers may thus be determined by accessing (e.g., querying) the media player module 270 to detect media identifiers for the source media files 315. These detected media identifiers may accordingly be determined as the second group of media identifiers.

In operation 830, the audit module 230 determines whether all of the source media files 315 are included among the authorized media files 325. This determination may be performed based on a comparison of the first group of media identifiers (e.g., from operation 810) to the second group of media identifiers (e.g., from operation 820).

In operation 840, the message module 240 presents a notification that indicates whether the mash-up media file 310 was generated exclusively from the authorized media files 325. The presenting of the notification may be based on whether all of the source media files 315 are included among the authorized media files 325, as determined in operation 830. For example, the message module 240 (e.g., whether located in the audit machine 110 or in the device 150), may cause the device 150 to display the notification to the user 152. According to some example embodiments, the notification indicates whether the user 152 is authorized to play the mash-up media file 310.

As shown in FIG. 9, the method 800 may include one or more of operations 910, 930, 940, 941, 950, 951, 953, 955, and 957. Operation 910 may be performed as part (e.g., a precursor task, a subroutine, or portion) of operation 810, in which the library module 210 accesses the first group of media identifiers. In operation 910, the library module 210 may access the first group of media identifiers by accessing a media library (e.g., media library 320) of the user 152 (e.g., a collection of media files owned by the user 152 and stored in the database 115 or at the device 150).

In situations where all of the source media files 315 are a subset of the authorized media files 325 (e.g., as shown in FIG. 3), operation 830 may be performed based on the second group of media identifiers (e.g., from operation 820) being included in the first group of media identifiers (e.g., from operation 810). Moreover, in such cases, operation 940 may be performed as part of operation 840, in which the message module 240 presents the notification regarding whether the mash-up media file 310 was generated exclusively from the authorized media files 325. In operation 940, the notification presented by the message module 240 indicates that the mash-up media file 310 has been generated exclusively from the subset of the authorized media files 325.

In these situations, the performance of operation 830 by the audit module 230 may determine that all of the source media files 315 are included among the authorized media files 325, and operation 941 may be performed subsequent to operation 840. In operation 941, the audit module 230 configures the media player module 270 to enable (e.g., allow) playback of the mash-up media file 310. This configuration of the media player module 270 may be performed based on (e.g., in response to) the source media files 315 all being included among the authorized media files 325.

In situations where the source media files 315 include at least one unauthorized media file that is absent from the authorized media files 325 (e.g., as shown in FIG. 4), operation 930 may be performed as part of operation 830, in which the audit module 230 determines whether all of the source media files 315 are included among the authorized media files 325. In operation 930, the audit module 230 determines that a media identifier of an unauthorized media file is included in the second group of media identifiers (e.g., from operation 820). This determination may be performed based on a comparison of the first group of media identifiers (e.g., from operation 810) to the second group of media identifiers (e.g., from operation 820). Accordingly, operation 830 may be performed based on the second group of media identifiers (e.g., from operation 820) including the media identifier that identifies the unauthorized media file and is absent from the first group of media identifiers (e.g., from operation 810).

Moreover, in such cases, operation 950 may be performed as part of operation 840, in which the message module 240 presents the notification regarding whether the mash-up media file 310 was generated exclusively from the authorized media files 325. In operation 950, the notification presented by the message module 240 indicates that the mash-up media file 310 was not generated exclusively from the subset of the authorized media files 325.

In these situations, the performance of operation 830 by the audit module 230 may determine that the source media files 315 include an unauthorized media file that is absent from the authorized media files 325, and one or more of operations 951, 953, 955, and 957 may be performed subsequent to operation 840. In operation 951, the audit module 230 configures the media player module 270 to disable (e.g., prevent) playback of the mash-up media file 310. This configuration of the media player module 270 may be performed based on (e.g., in response to) the source media files 315 including the unauthorized media file, which is absent from the authorized media files 325.

In operation 953, the message module 240 presents a suggestion (e.g., within a message, notification, an alert, warning, or an advertisement) that the user 152 authorize the unauthorized media file, for example, by purchasing an authorization to play the unauthorized media file (e.g., and thereby obtain authorization to play the mash-up media file 310, which in this situation is generated, at least in part, from the unauthorized media file). For example, the message module 240 (e.g., whether located in the audit machine 110 or in the device 150), may cause the device 150 to display the suggestion to the user 152. In some example embodiments, the presented suggestion contains a user interface that is operable to initiate a transaction to purchase such an authorization (e.g., electronic storefront). In certain example embodiments, the presented suggestion contains a link to such a user interface.

In various example embodiments, the presented suggestion indicates that purchase of such an authorization enables, or will enable, playback of one or more additional mash-up media files that each were generated, at least in part, from the unauthorized media file. For example, the presented suggestion may include a list of mash-up media files (e.g., mash-up media file 310) for which playback will be enabled upon purchase of an authorization to play the unauthorized media file.

In cases where the user 152 operates a user interface to initiate a purchase of such an authorization, operations 955 and 957 may be performed. In operation 955, the audit module 230 initiates the transaction to purchase the authorization to play the unauthorized media file (e.g., and thereby purchase authorization to play the mash-up media file 310, which in this situation is generated, at least in part, from the unauthorized media file). For example, the audit module 230 may cause electronic storefronts to initiate such a purchase transaction. After completion of such a transaction, operation 957 may be performed by the audit module 230. In operation 957, the library module 210 detects that the initiated transaction is complete and, based on this detection, updates the first group of media identifiers (e.g., accessed in operation 810) to include the media identifier of the media file for which authorization was purchased by completion of the transaction. Accordingly, library module 210 may update the authorized media files 325 to include the newly authorized media file.

As shown in FIG. 10, the method 800 may include one or more of operations 1012, 1040, and 1050. Operation 1012 may be performed prior to operation 820, in which the mash-up module 220 determines the second group of media identifiers (e.g., for the source media files 315).

In operation 1012, the mash-up module 220 detects a reference to the mash-up media file 310 (e.g., a mention of the mash-up media file 310, a link to a network-location from which the mash-up media file 310 is available, or a review of the mash-up media file 310). For example, the reference may be detected (e.g., accessed) in a query received from the user 152 via his device 150 (e.g., a query for mash-up files), in search results provided in response to such a query, or both. As another example, the reference may be detected in a recommendation (e.g., a suggestion or advertisement) that is sent to the user 152 by one of his social connections (e.g., a further user that is socially connected to the user 152 by a social networking service). In example embodiments that include operation 1012, the determining of the second group of media identifiers in operation 820 may be performed based on (e.g., in response to) this detected reference to the mash-up media file 310.

In situations where all of the source media files 315 are a subset of the authorized media files 325 (e.g., as shown in FIG. 3), operation 1040 may be performed as part of operation 840, in which the message module 240 presents the notification regarding whether the mash-up media file 310 was generated exclusively from the authorized media files 325. In operation 1040, the notification presented by the message module 240 indicates that the user 152 is authorized to play the mash-up media file 310. In some example embodiments, the notification recommends the mash-up media file 310 to the user 152 (e.g., contains a recommendation or suggestion that the user 152 obtain the mash-up media file 310, play the mash-up media file 310, or both).

In situations where the source media files 315 include at least one unauthorized media file that is absent from the authorized media files 325 (e.g., as shown in FIG. 4), operation 1050 may be performed as part of operation 840, in which the message module 240 presents the notification regarding whether the mash-up media file 310 was generated exclusively from the authorized media files 325. In operation 1050, the notification presented by the message module 240 indicates that the user 152 is not authorized to play the mash-up media file 310. In some example embodiments, the notification recommends the mash-up media file 310 to the user 152 (e.g., contains a recommendation or suggestion that the user 152 obtain the mash-up media file 310 and obtain authorization to play the at least one unauthorized media file, so as to obtain authorization to play the mash-up media file 310).

According to various example embodiments, one or more of the methodologies described herein may facilitate merchandising a media file based on an ownership audit of a user's media library. Moreover, one or more of the methodologies described herein may facilitate merchandising an unauthorized media file from which a mash-up media file has been generated, based on such an ownership audit. Hence, one or more the methodologies described herein may facilitate creation, publication, and sharing of mash-up media files, while cooperating with one or more digital rights management schemes that may be applicable to source media files used to generate mash-up media files.

When these effects are considered in aggregate, one or more of the methodologies described herein may obviate a need for certain efforts or resources that otherwise would be involved in creating, publishing, and sharing mash-up media files, implementing digital rights management schemes, or any suitable combination thereof. Efforts expended by users of media files and by administrators of digital rights management schemes may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 11:
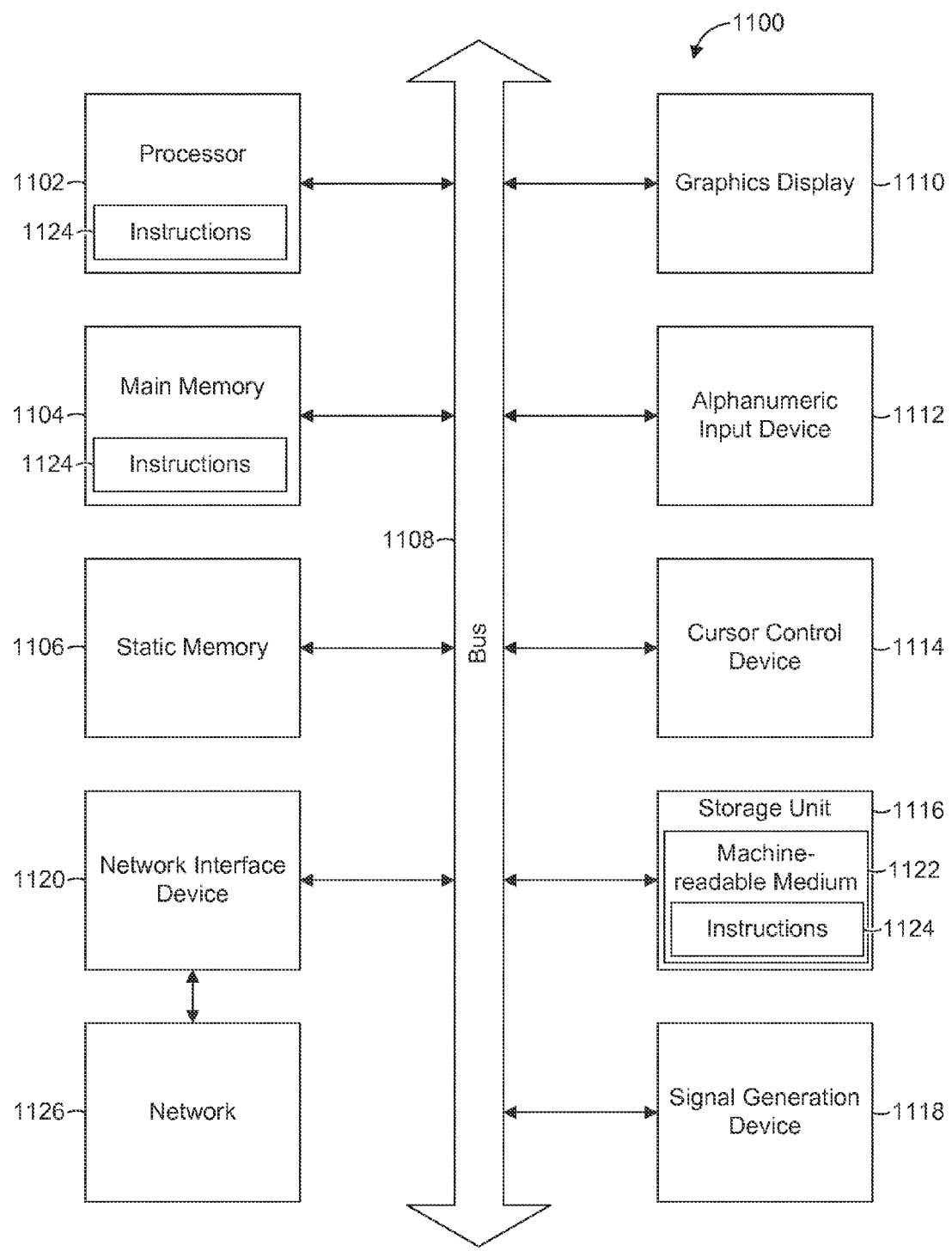
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 11 shows a diagrammatic representation of the machine 1100 in the example form of a computer system and within which instructions 1124 (e.g., software, a program, an application, an applet, an app, or other executable code) for causing the machine 1100 to perform any one or more of the methodologies discussed herein may be executed, in whole or in part. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 190) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as hits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A system comprising:
a library module configured to access a first plurality of media identifiers that identify authorized media files that a user is authorized to play;
a mash-up module configured to determine a second plurality of media identifiers that identify source media files that store media tracks each selected by the user for at least partial inclusion within a mash-up media file to be generated by the user from the source media files;
a processor configured by an audit module to determine whether all of the source media files are included among the authorized media files based on a comparison of the first plurality of media identifiers to the second plurality of media identifiers; and
a message module configured to present a notification that indicates whether the mash-up media file can be generated exclusively from the authorized media files, the notification being presented based on whether all of the source media files are included among the authorized media files.

2. A method comprising:
accessing a first plurality of media identifiers that identify authorized media files that a user is authorized to play;
determining a second plurality of media identifiers that identify source media files that store media tracks each selected by the user for at least partial inclusion within a mash-up media file to be generated by the user from the source media files;
determining whether all of the source media files are included among the authorized media files based on a comparison of the first plurality of media identifiers to the second plurality of media identifiers,
the determining being performed by a processor of a machine; and
presenting a notification that indicates whether the mash-up media file can be generated exclusively from the authorized media files,
the notification being presented based on whether all of the source media files are included among the authorized media files.

3. The method of description 2, wherein:
at least two of the media tracks selected by the user are from separate media files and selected for at least partial inclusion within a simultaneous mix of media tracks within the mash-up media file.

4. The method of description 2 or description 3, wherein:
the accessing of the first plurality of media identifiers includes accessing a media library that corresponds to the user and indicates that the user owns the authorized media files.

5. The method of any of descriptions 2-4, wherein:
the source media files are a subset of the authorized media files;
the determining of whether all of the source media files are included among the authorized media files is based on the second plurality of media identifiers being included in the first plurality of media identifiers; and
the presented notification indicates that the mash-up media file can be generated exclusively from the subset of the authorized media files.

6. The method of any of descriptions 2-5, wherein:
the determining of whether all of the source media files are included among the authorized media files determines that all of the source media files are included among the authorized media files; and the method further comprises
configuring a media editor application to enable generation of the mash-up media file from the source media files based on the source media files all being included among the authorized media files.

7. The method of any of descriptions 2-4, wherein:
the source media files include an unauthorized media file that is absent from the authorized media files;
the determining of whether all of the source media files are included among the authorized media files is based on the second plurality of media identifiers including a media identifier that identifies the unauthorized media file and is absent from the first plurality of media identifiers; and
the presented notification indicates that the mash-up media file cannot be generated exclusively from the authorized media files.

8. The method of description 7 further comprising:
presenting a suggestion that the user authorize the unauthorized media file by purchasing an authorization to play the unauthorized media file.

9. The method of description 7 or description 8 further comprising:
configuring a media editor application to disable generation of the mash-up media file from the source media files based on the unauthorized media file being absent from the authorized media files.

10. A tangible (e.g., non-transitory) machine-readable storage medium comprising instructions that, when executed by one or more processors of a machine, cause the machine to perform operations comprising:
accessing a first plurality of media identifiers that identify authorized media files that a user is authorized to play;
determining a second plurality of media identifiers that identify source media files that store media tracks each selected by the user for at least partial inclusion within a mash-up media file to be generated by the user from the source media files;
determining whether all of the source media files are included among the authorized media files based on a comparison of the first plurality of media identifiers to the second plurality of media identifiers,
the determining being performed by the one or more processors of the machine; and
presenting a notification that indicates whether the mash-up media file can be generated exclusively from the authorized media files,
the notification being presented based on whether all of the source media files are included among the authorized media files.

11. A system comprising:
a library module configured to access a first plurality of media identifiers that identify authorized media files that a user is authorized to play;
a mash-up module configured to determine a second plurality of media identifiers that identify source media files that store media tracks each at least partially included within a mash-up media file generated by the user from the source media files;
a processor configured by an audit module to determine whether all of the source media files are included among the authorized media files based on a comparison of the first plurality of media identifiers to the second plurality of media identifiers; and a message module configured to present a notification that indicates whether the mash-up media file is generated exclusively from the authorized media files,
the notification being presented based on whether all of the source media flies are included among the authorized media files.

12. A method comprising:
accessing a first plurality of media identifiers that identify authorized media files that a user is authorized to play;
determining a second plurality of media identifiers that identify source media files that store media tracks each at least partially included within a mash-up media file generated by the user from the source media files;
determining whether all of the source media files are included among the authorized media files based on a comparison of the first plurality of media identifiers to the second plurality of media identifiers,
the determining being performed by a processor of a machine; and
presenting a notification that indicates whether the mash-up media file is generated exclusively from the authorized media files,
the notification being presented based on whether all of the source media files are included among the authorized media files.

13. The method of description 12, wherein:
at least two of the media tracks are from separate source media files and each at least partially included within a simultaneous mix of media tracks within the mash-up media file.

14. The method of description 12 or description 13, wherein:
the accessing of the first plurality of media identifiers includes accessing a media library that corresponds to the user and indicates that the user owns the authorized media files.

15. The method of any of descriptions 12-14, wherein:
the source media files are a subset of the authorized media files;
the determining of whether all of the source media files are included among the authorized media files is based on the second plurality of media identifiers being included in the first plurality of media identifiers; and
the presented notification indicates that the mash-up media file is generated exclusively from the subset of the authorized media files.

16. The method of any of descriptions 12-15, wherein:
the determining of whether all of the source media files are included among the authorized media files determines that all of the source media files are included among the authorized media files; and the method further comprises
configuring a media publisher application to enable publication of the mash-up media file based on the source media files all being included among the authorized media files.

17. The method of any of descriptions 12-14, wherein:
the source media files include an unauthorized media file that is absent from the authorized media files;
the determining of whether all of the source media files are included among the authorized media files based on the second plurality of media identifiers including a media identifier that identifies the unauthorized media file and is absent from the first plurality of media identifiers; and
the presented notification indicates that the mash-up media file is not generated exclusively from the authorized media files.

18. The method of claim 17, wherein:
the determining of whether all of the source media files are included among the authorized media files determines that the unauthorized media file is absent from the authorized media files; and the method further comprises
presenting a suggestion that the user authorize the unauthorized media file by purchasing an authorization to play the unauthorized media file.

19. The method of claim 17 further comprising:
configuring a media publisher application to disable publication of the mash-up media file based on the unauthorized media file being absent from the authorized media files.

20. A tangible (e.g., non-transitory) machine-readable storage medium comprising instructions that, when executed by one or more processors of a machine, cause the machine to perform operations comprising:
accessing a first plurality of media identifiers that identify authorized media files that a user is authorized to play;
determining a second plurality of media identifiers that identify source media files that store media tracks each at least partially included within a mash-up media file generated by the user from the source media files;
determining whether all of the source media files are included among the authorized media files based on a comparison of the first plurality of media identifiers to the second plurality of media identifiers,
the determining being performed by the one or more processors of the machine; and
presenting a notification that indicates whether the mash-up media file is generated exclusively from the authorized media files,
the notification being presented based on whether all of the source media files are included among the authorized media files.

21. A system comprising:
a library module configured to access a first plurality of media identifiers that identify authorized media files that a first user is authorized to play;
a mash-up module configured to determine a second plurality of media identifiers that identify source media files used by a second user to generate a mash-up media file that includes media tracks from the source media files;
a processor configured by an audit module to determine whether all of the source media files are included among the authorized media files based on a comparison of the first plurality of media identifiers to the second plurality of media identifiers; and
a message module configured to present a notification that indicates whether the first user is authorized to play the mash-up media file generated by the second user, the notification being presented based on whether all of the source media files are included among the authorized media files.

22. The system of description 21, wherein:
at least two of the media tracks are from separate source media files and are each at least partially included within a simultaneous mix of media tracks within the mash-up media file.

23. The system of description 21 or description 22, wherein:
the source media files include an unauthorized media file that is absent from the authorized media files;
the audit module configures the processor to determine whether all of the source media files are included among the authorized media files based on the second plurality of media identifiers including a media identifier that identifies the unauthorized media file and is absent from the first plurality of media identifiers; and the presented notification indicates that the first user is not authorized to play the mash-up media file.

24. A method comprising:

accessing a first plurality of media identifiers that identify authorized media files that a first user is authorized to play;

determining a second plurality of media identifiers that identify source media files used by a second user to generate a mash-up media file that includes media tracks from the source media files;

determining whether all of the source media files are included among the authorized media files based on a comparison of the first plurality of media identifiers to the second plurality of media identifiers, the determining being performed by a processor of a machine; and presenting a notification that indicates whether the first user is authorized to play the mash-up media file generated by the second user, the notification being presented based on whether all of the source media files are included among the authorized media files.

25. The method of description 24, wherein:

at least two of the media tracks are from separate source media files and are each at least partially included within a simultaneous mix of media tracks within the mash-up media file.

26. The method of description 24 or description 25, wherein:

the accessing of the first plurality of media identifiers includes accessing a media library that corresponds to the user and indicates that the first user owns the authorized media files.

27. The method of any of descriptions 24-26 further comprising:

detecting a reference to the mash-up media file in a query received from the first user; and wherein the determining of the second plurality of media identifiers is in response to the detecting of the reference to the mash-up media file in the query.

28. The method of any of descriptions 24-26 further comprising:

detecting a reference to the mash-up media file in a recommendation sent to the first user by a further user that is socially connected to the first user; and wherein the determining of the second plurality of media identifiers is in response to the detecting of the reference in the recommendation.

29. The method of any of descriptions 24-28, wherein:

the mash-up media file is generated exclusively from the authorized media files; the determining of whether all of the source media files are included among the authorized media files is based on the second plurality of media identifiers being included in the first plurality of media identifiers; and the presented notification indicates that the first user is authorized to play the mash-up media file.

30. The method of description 29, wherein:

the determining of whether all of the source media files are included among the authorized media files determines that all of the source media files are included among the authorized media files; and the method further comprises configuring a media player application to enable playback of the mash-up media file based on the source media files all being included among the authorized media files.

31. The method of description 29 or description 30, wherein:

the presented notification recommends the mash-up media file to the first user.

32. The method of any of descriptions 24-28, wherein:

the source media files include an unauthorized media file that is absent from the authorized media files;

the determining of whether all of the source media files are included among the authorized media files is based on the second plurality of media identifiers including a media identifier that identifies the unauthorized media file and is absent from the first plurality of media identifiers; and the presented notification indicates that the first user is not authorized to play the mash-up media file.

33. The method of description 32, wherein:

the determining of whether all of the source media files are included among the authorized media files determines that the unauthorized media file is absent from the authorized media files; and the method further comprises presenting a suggestion that the first user authorize the unauthorized media file by purchasing an authorization to play the unauthorized media file.

34. The method of description 33, wherein:

the presented suggestion indicates that the authorization to play the unauthorized media file enables playback of the mash-up media file.

35. The method of description 32 or description 33, wherein:

the presented suggestion indicates that the authorization to play the unauthorized media file enables playback of a further mash-up media file generated based on the unauthorized media file.

36. The method of any of descriptions 32-35 further comprising:

initiating a transaction by which the first user purchases the authorization to play the unauthorized media file; and updating the first plurality of media identifiers in response to an indication that the transaction is complete, 37. The method of any of description 32-35, wherein:

configuring a media player application to disable playback of the mash-up media file to the first user based on the unauthorized media file being absent from the authorized media files.

38. A tangible (e.g., non-transitory) machine-readable storage medium comprising instructions that, when executed by one or more processors of a machine, cause the machine to perform operations comprising:

accessing a first plurality of media identifiers that identify authorized media files that a first user is authorized to play;

determining a second plurality of media identifiers that identify source media files used by a second user to generate a mash-up media file that includes media tracks from the source media files;

determining whether all of the source media files are included among the authorized media files based on a comparison of the first plurality of media identifiers to the second plurality of media identifiers, the determining being performed by the one or more processors of the machine; and presenting a notification that indicates whether the first user is authorized to play the mash-up media file generated by the second user, the notification being presented based on whether all of the source media files are included among the authorized media files.

39. The tangible machine-readable storage medium of description 38, wherein:

at least two of the media tracks are from separate source media files and are each at least partially included within a simultaneous mix of media tracks within the mash-up media file.

40. The tangible machine-readable storage medium of description 38 or description 39, wherein:
the source media files include an unauthorized media file that is absent from the authorized media files;
the determining of whether all of the source media files are included among the authorized media files is based on the second plurality of media identifiers including a media identifier that identifies the unauthorized media file and is absent from the first plurality of media identifiers; and
the presented notification indicates that the first user is not authorized to play the mash-up media file.

What is claimed is:

1. A system comprising:
one or more processors, and a memory including instructions, which when executed by the one or more processors, cause the one or more processors to perform operations comprising:
access a first plurality of media identifiers that identify authorized media files that a first user is authorized to play;
identify at least two or more source media files being used by a second user to generate a single mash-up media file, the single mash-up media file includes at least a portion of media tracks from each of the at least two or more source media files;
determine a second plurality of media identifiers that identify the at least two or more source media files;
determine whether all of the source media files of the single mash-up media file are included among the authorized media files based on a comparison of the first plurality of media identifiers to the second plurality of media identifiers;
present a notification that indicates whether the first user is authorized to play the single mash-up media file generated by the second user, the notification being presented based on whether all of the source media files are included among the authorized media files;
configure a media player application to disable playback of the single mash-up media file based on determining that the source media files include at least one unauthorized media file; and
present an option for the first user to authorize the unauthorized media file by purchasing an authorization to play the at least one unauthorized media file.

2. The system of claim 1, wherein:
at least two of the media tracks are from separate source media files and are each at least partially included within a simultaneous mix of media tracks within the single mash-up media file.

3. The system of claim 1, wherein:
the source media files include an unauthorized media file that is absent from the authorized media files;
determine whether all of the source media files are included among the authorized media files based on the second plurality of media identifiers including a media identifier that identities the unauthorized media file and is absent from the first plurality of media identifiers; and
the presented notification indicates that the first user is not authorized to play the single mash-up media file.

4. A method comprising:
accessing a first plurality of media identifiers that identify authorized media files that a first user is authorized to play;
identifying at least two or more source media files used by a second user to generate a single mash-up media file, the single mash-up media file includes at least a portion of media tracks from each of the at least two or more source media files;
determining a second plurality of media identifiers that identify the at least two or more source media files;
determining whether all of the source media files of the single mash-up media file are included among the authorized media files based on a comparison of the first plurality of media identifiers to the second plurality of media identifiers, the determining being performed by a processor of a machine;
presenting a notification that indicates whether the first user is authorized to play the single mash-up media file generated by the second user, the notification being presented based on whether all of the source media files are included among the authorized media files;
configuring a media player application to disable playback of the single mash-up media file based on determining that the source media files include at least one unauthorized media file; and
presenting an option for the first user to authorize the unauthorized media file by purchasing an authorization to play the at least one unauthorized media file.

5. The method of claim 4, wherein:
at least two of the media tracks are from separate source media files and are each at least partially included within a simultaneous mix of media tracks within the single mash-up media file.

6. The method of claim 4, wherein:
the accessing of the first plurality of media identifiers includes accessing a media library that corresponds to the first user and indicates that the first user owns the authorized media files.

7. The method of claim 4 further comprising:
detecting a reference to the single mash-up media file in a query received from the first user; and wherein
the determining of the second plurality of media identifiers is in response to the detecting of the reference to the single mash-up media file in the query.

8. The method of claim 4 further comprising:
detecting a reference to the single mash-up media file in a recommendation sent to the first user by a further user that is socially connected to the first user; and wherein
the determining of the second plurality of media identifiers is in response to the detecting of the reference in the recommendation.

9. The method of claim 4, wherein:
the single mash-up media file is generated exclusively from the authorized media files;
the determining of whether all of the source media tiles are included among the authorized media files is based on the second plurality of media identifiers being included in the first plurality of media identifiers; and
presented notification indicates that the first user is authorized to play the single mash-up media file.

10. The method of claim 9, wherein:
the determining of whether all of the source media files are included among the authorized media files determines that all of the source media files are included among the authorized media files; and the method further comprises
configuring a second media player application to enable playback of the single mash-up media file based on the source media files all being included among the authorized media files within the second media player application.

11. The method of claim 9, wherein:
the presented notification recommends the single mash-up media file to the first user.

12. The method of claim 4, wherein:
the source media files include an unauthorized media file that is absent from the authorized media files;
the determining of whether all of the source media files are included among the authorized media files is based on the second plurality of media identifiers including a media identifier that identifies the unauthorized media file and is absent from the first plurality of media identifiers; and
the presented notification indicates that the first user is not authorized to play the single mash-up media file.

13. The method of claim 12, wherein:
the presented option indicates that the authorization to play the unauthorized media file enables playback of the single mash-up media file.

14. The method of claim 12, wherein: the presented suggestion indicates that the authorization to play the unauthorized media file enables playback of a further mash-up media file generated based on the unauthorized media file.

15. The method of claim 12 further comprising:
initiating a transaction by which the first user purchases the authorization to play the unauthorized media file; and
updating the first plurality of media identifiers in response to an indication that the transaction is complete.

16. A non-transitory machine-readable medium comprising instructions that, when executed by one or more processors of a machine, cause the machine to perform operations comprising:
accessing a first plurality of media identifiers that identify authorized media files that a first user is authorized to play;
identifying at least two or more source media files used by a second user to generate a single mash-up media file the single mash-up media file includes at least a portion of media tracks from each of the at least two or more source media files;
determining a second plurality of media identifiers that identify the at least two or more source media files;
determining whether all of the source media files of the single mash-up media file are included among the authorized media files based on a comparison of the first plurality of media identifiers to the second plurality of media identifiers, the determining being performed by the one or more processors of the machine;
presenting a notification that indicates whether the first user is authorized to play the single mash-up media file generated by the second user, the notification being presented based on whether all of the source media files are included among the authorized media files;
configuring a media player application to disable playback of the single mash-up media file based on determining that the source media files include at least one unauthorized media file; and
presenting an option for the first user to authorize the unauthorized media file by purchasing an authorization to play the at least one unauthorized media file.

17. The non-transitory machine-readable medium of claim 16, wherein:
at least two of the media tracks are from separate source media files and are each at least partially included within a simultaneous mix of media tracks within the single mash-up media file.

18. The non-transitory machine-readable medium of claim 16, wherein:
the source media files include an unauthorized media file that is absent from the authorized media files;
the determining of whether all of the source media files are included among the authorized media files is based on the second plurality of media identifiers including a media identifier that identifies the unauthorized media file and is absent from the first plurality of media identifiers; and
the presented notification indicates that the first user is not authorized to play the single mash-up media file.

\* \* \* \* \*